Oct. 21, 1952     B. C. EISENBERG     2,614,680
MACHINE FOR RINSING BOTTLED FRUITS AND THE LIKE
Filed July 1, 1949     3 Sheets-Sheet 1
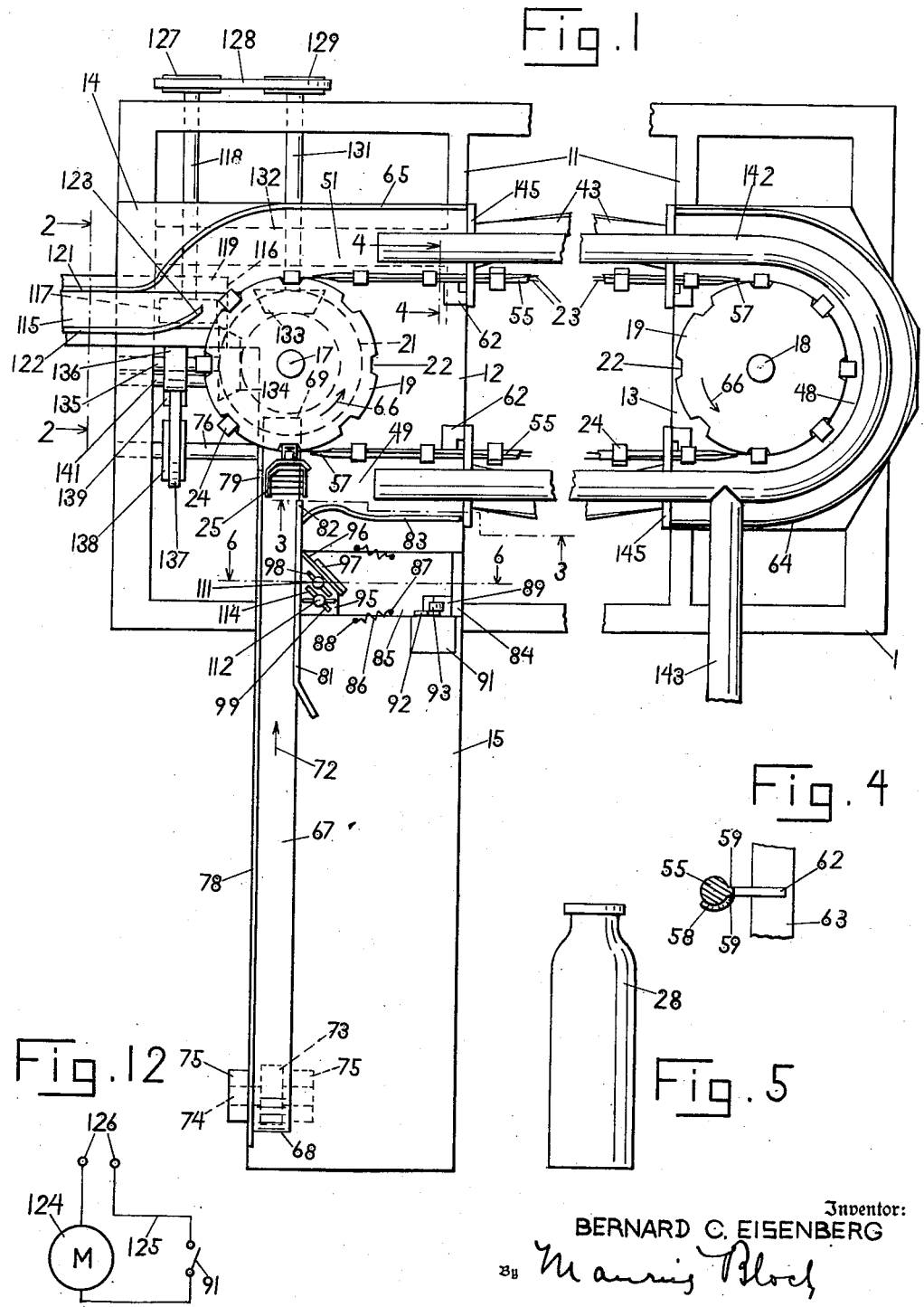
Inventor:
BERNARD C. EISENBERG
Attorney Oct. 21, 1952    B. C. EISENBERG    2,614,680
MACHINE FOR RINSING BOTTLED FRUITS AND THE LIKE
Filed July 1, 1949      3 Sheets-Sheet 2
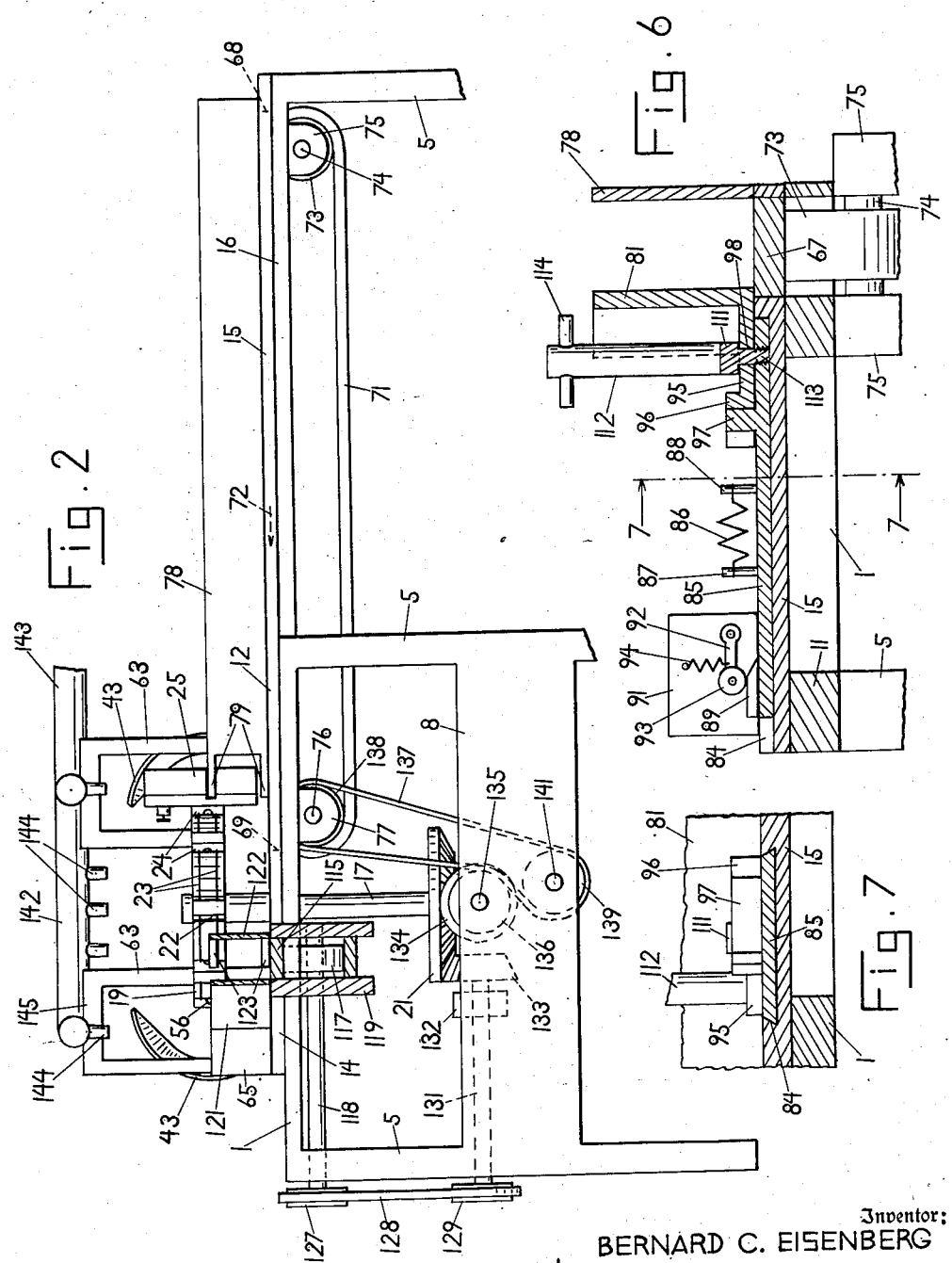
Inventor:
BERNARD C. EISENBERG
By
Attorney

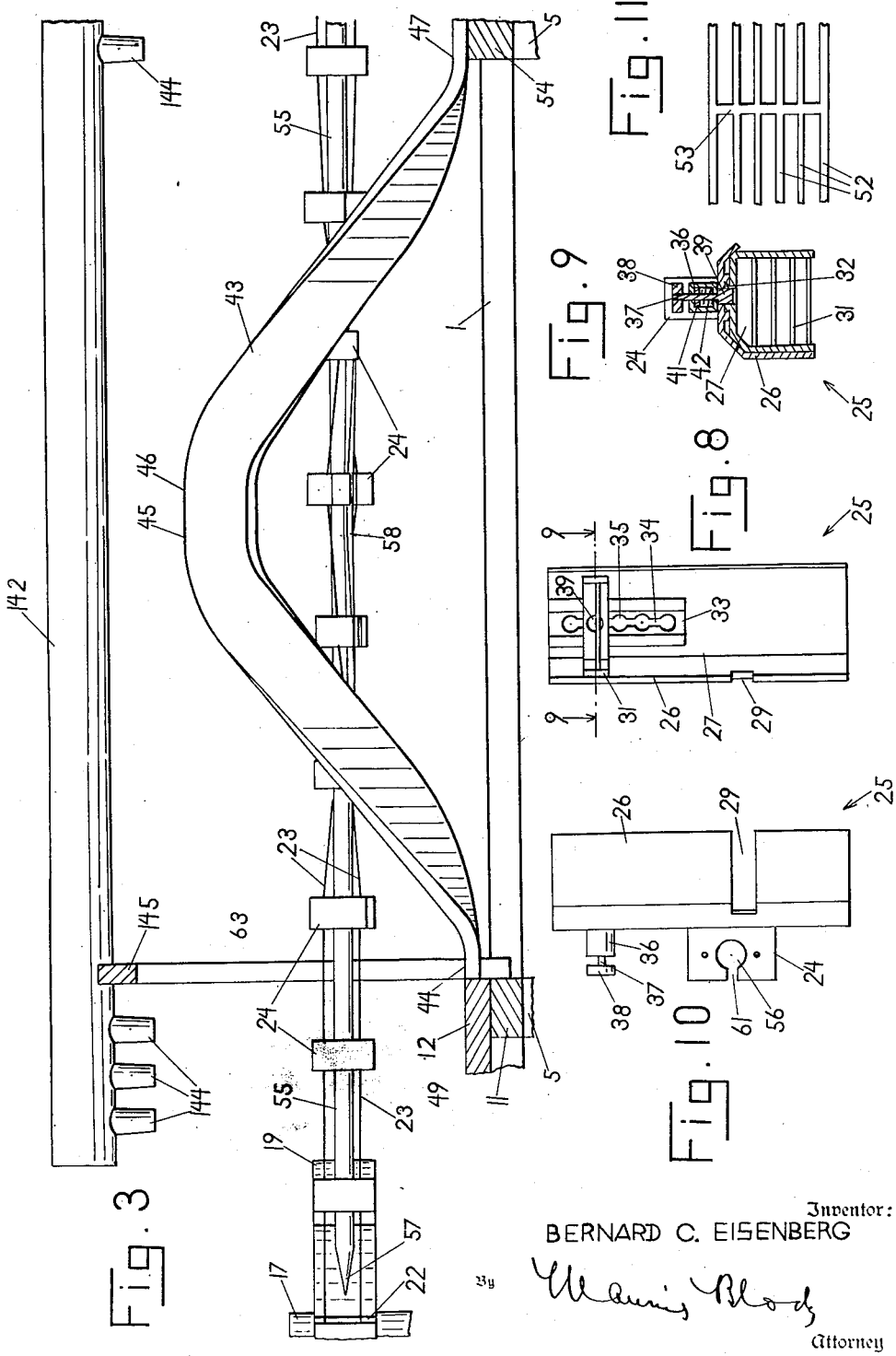

Patented Oct. 21, 1952

2,614,680

UNITED STATES PATENT OFFICE 2,614,680

MACHINE FOR RINSING BOTTLED FRUITS AND THE LIKE

Bernard C. Eisenberg, Brooklyn, N. Y.

Application July 1, 1949, Serial No. 102,485

6 Claims. (Cl. 198—33)

My invention relates to machines for treating bottled fruits or, more particularly, to machines for rinsing olives or other fruits after they have been filled in bottles.

Olives, for example, are usually filled in bottles together with pimentos and then have to be rinsed several times by pouring water alternately into and out of the bottles. For this purpose, the bottles must be turned repeatedly. This operation has been hitherto performed by hand. Objects of my invention are to replace this hand work by machine work, to provide a machine which rinses the bottled fruits automatically, and thereby to make the rinsing operation less expensive, quicker and uniformly thorough.

Other objects are to provide a machine that can handle and rinse bottles of different sizes, of different diameters and of different heights, and to facilitate the adjustment of the machine to bottles of any of these sizes.

Further objects are to rinse bottles containing loosely packed fruits as well as bottles with tightly packed fruits, and to prevent escape of fruits from the bottles when the latter are turned for rinsing.

Still other objects are to stop the machine when a bottle topples into a position where the bottle jams the machine movement, thereby to prevent breakage of bottles or damage of machine parts, and to provide a rinsing machine that operates smoothly and safely.

Still further objects are to provide the machine with a transport mechanism moving the bottles during the rinsing operation over a predetermined track, to carry the bottles to be rinsed into this track, to carry the rinsed bottles out of this track, and to co-ordinate these movements of the bottles by gears connecting the moving mechanisms.

Still other objects are to provide the rinsing machine with a structure adapted for combination with or for addition to a machine of that known type which is used for brining and capping fruit bottles, to derive the movement of the rinsing machine from the movement of the capping machine, thereby to provide a machine combination which automatically treats fruit bottles from the rinsing operation, inclusively, until the bottles are ready for shipment, and to drive this machine combination by one motor.

Fig. 1 shows a top view of an illustrative embodiment of my invention, a median part of this embodiment being broken off and omitted.

Fig. 2 shows a lateral view of the same embodiment, seen from the left side in Fig. 1, some sectionally represented parts being cut along the line 2—2 in Fig. 1, some legs being broken off.

Fig. 3 shows a cross-section of a broken off part of the same embodiment, this cross-section being taken along the broken line 3—3 in Fig. 1, comprising a portion of the parts omitted in Fig. 1, and omitting the cage shown in Fig. 1.

Fig. 4 shows a cross-section of a broken off detail of the same embodiment, this cross-section being taken along the line 4—4 in Fig. 1.

Fig. 5 shows a side view of a bottle which may be filled with fruits and then may be rinsed in the embodiment shown in the other figures.

Fig. 6 shows a cross-section of another broken off part of the same embodiment, this cross-section being taken along the line 6—6 in Fig. 1.

Fig. 7 shows a cross-section taken along the line 7—7 in Fig. 6.

Fig. 8 shows a side view of a cage which is a part of the same embodiment.

Fig. 9 shows a cross-section taken along the line 9—9 in Fig. 8.

Fig. 10 shows a view of this cage seen from the left side in Fig. 8.

Fig. 11 shows a side view of a broken off portion of a wound track which may be used in the same embodiment, this broken off portion being represented unwound in a plane.

All these figures are represented on reduced scales. The scale of Fig. 3 is less reduced than that of Figs. 1 and 2. The scale of Figs. 4 to 11 is still less reduced.

Fig. 12 shows a diagram of a circuit that may be used in the same embodiment.

The embodiment shown in the drawings forms a part of a machine combination which, in addition to the rinsing machine which is the subject matter of this application, comprises a machine for brining and capping fruit bottles. The latter machine is well known and is not represented in the drawing with the exception of some parts which are common to or connect the rinsing machine and the brining and capping machine. The latter parts are broken off at the left end of Fig. 1.

Referring to the drawings, numeral 1 indicates a horizontal frame of substantially rectangular shape. This frame is supported by legs 5. The supporting structure comprising the frame 1 and the legs 5 is provided with traverses wherever needed for reinforcement or for the support of other elements of the machine. For example, a traverse 8 connects two of the legs 5 (Fig. 2) and several traverses 11 cross the inner space of the frame 1 (Fig. 1).

Two plates or platforms 12 and 13 are affixed on top of the frame 1. The platform 12 may form a right angle having a short leg 14 extending toward the left side in Fig. 1 and having a longer leg 15 extending toward the lower side in Fig. 1 over a correspondingly shaped extension 16 (Fig. 2) of the frame 1. The platform 13 is positioned at that end of the frame 1 which is at the right side in Fig. 1.

A vertical shaft 17 passes rotatably through a bore of the platform 12, and a similar shaft 18 passes rotatably through a bore of the platform 13. Each of the shafts 17 and 18 is affixed to a drum or horizontal wheel 19 which is positioned at a distance over the respective platform. The lower end of the shaft 17 is affixed to a conical wheel 21.

Each drum 19 is provided with recesses 22 distributed over its cylindrical circumference at equal intervals. Two wires or similar flexible elements 23 extend from one drum 19 to the other and around the far sides of these drums. Each wire 23 is endlessly or circularly connected and may fit and enter circular grooves of the two drums. A number of blocks 24 have bores for the passage of the wires 23 and are affixed to these wires at equal intervals corresponding to the intervals between the recesses 22. The blocks 24 fit and engage the recesses 22 in a manner similar to the links of a chain.

Each block 24 is permanently affixed to a cage 25 and forms an extension of this cage. In Figs. 1 and 2, all cages 25 but one are omitted for the sake of clearer representation. The identical structure of all cages is best to be seen in Figs. 8, 9 and 10. This structure comprises a bent wall 26 extending vertically when the cage is in erect position and surrounding a cavity 27 adapted to receive a fruit bottle, for example the bottle 28 shown in Fig. 5. The wall 26 leaves open that side of the cavity which is the front side in Fig. 8, and may leave partially open that side which is at the right side in this figure. The left side of the wall 26 is provided with a slot 29 for a purpose that will be described later.

A grate 31 extends perpendicularly to the side wall 26 across the top of the cavity 27. The position of this grate can be adjusted in a direction parallel to the side wall 26. For example, the grate 31 has a dove-tailed projection 32 slidable in a vertical dove-tailed groove 33 of the side wall 26. A slot 34 passes at the bottom of the groove 33 through the side wall. This slot comprises narrow passages connecting wider openings 35. A small case 36 is slidable along the slotted outer surface of the wall 26 and has openings through which a thin stem 37 slidably passes. A button 38 is affixed to outer end of the stem 37. The opposite end of this stem is provided with a cylindrical head 39 which fits any of the openings 35 and reaches slidably into an opening of the grate 31. A disk 41 positioned in the case 36 is affixed to the stem 37. The case 36 further contains a spring 42 which urges the disk 41 and hence the stem 37 outwardly into the position shown in Fig. 9.

In this position, the head 39 engages one of the openings 35 whereby the grate 31 is secured against sliding movement. In order to adjust the grate to a different height, the button 38 is pressed against the resistance of the spring 42 whereby the head 39 is moved inwardly so far that the stem 37 can slide through the narrow passages of the slot 34. The case is then moved together with the grate 31 up or down into a position where the head 39 is in line with another opening 35. Then the spring 42 urges the stem outwardly and brings the head 39 into this other opening, securing the grate at a level corresponding to this other opening. In this manner the cage or its cavity can be adjusted for bottles of different heights.

The blocks 24 connect the cages 25 with the wires 23. Hence the cages are movable in a circularly returning path determined by the wires 23. This path runs over and parallel to the platforms 12 and 13 and along two wound or helical connections 43 extending from one platform to the other. Each of these connections is so shaped that its surface facing the cage varies its inclination along the path between the two platforms. For example, this variation comprises two waves of the type shown in Fig. 3. At a point 44 near to the platform 12, the inclination is zero, the mentioned surface of the connection 43 having the same horizontal direction as the platform. From 44 to 45, the inclination increases in substantially screw-like manner from zero to one hundred and thirty-five degrees. From 45 to 46, the inclination remains uniform. From 46 to 47, the inclination diminishes from one hundred and thirty-five degrees to zero. After a short horizontal stretch, this increasing and diminishing wave is repeated. The terminal line which is again horizontal abuts the platform 13.

The cages 25 are so guided that each cage varies its inclination, while moving between the platforms, in the same manner as the surface of the connections 43 whereby the longitudinal direction of the cage and of the bottles transported by this cage is always perpendicular to this surface. Hence the entire path of the cages runs over and along a stationary track which comprises horizontal stretches and wound stretches. The connections 43 constitute track parts incorporating the wound and inclined track parts. A horizontal track part 48 leads over the platform 13. Other horizontal track parts 49 and 51 are portions of the platform 12.

The track part 43 may form a solid body as shown in Fig. 3 or may have a grate-like structure comprising longitudinal and spaced elements 52 which may be connected at intervals by traverses 53 as shown in Fig. 11. This track part may be supported in any suitable manner. For example, its ends may be affixed to the platforms 12 and 13, and median points may be carried by a traverse 54 affixed to the frame 1.

The cages 25 are guided on their path between the drums 19 by two guide members 55 which the cages engage by means of their blocks 24. Each block has a bore 56 in the direction of this path. Each member 55 comprises an elongated cylindrical portion slidably fitting the bores 56 and extending substantially horizontally in the direction of this path. The members 55 may have tapering ends 57 pointing toward the circumferences of the drums 19 whereby the correct engagement of the guide member with a block approaching from a drum is facilitated.

Each guide member 55 further comprises a lateral projection 58 forming a strip extending in partly winding direction along the cylindrical portion of the member. In Fig. 1, the scale does not allow representation of this strip. In Fig. 3, a small portion of the strip 58 is visible. Fig. 4 shows the strip 58 clearly. The cross-section of this strip is substantially rectangular and has two parallel sides 59 which slidingly fit a slot 61 (Fig. 10) of each block 24. This slot extends from the bore 56 to that side which is opposite to the cage 25.

The strip 58 is wound along the cylindrical portion of the guide member helically or screw-like in such a manner that its sides 59 are, at any point of its length, parallel to the track described before. In other words, the variation of the inclination of these sides follows the same pattern as the inclination of the track parts 43. Hence the blocks and the cages, moving from one drum to the other, are so guided that they, in addition to this progressive movement, turn oscillatingly about the direction of this movement. This turning movement varies the position of the cages in a range of more than ninety, for example, in a range of one hundred and thirty-five degrees.

From the foregoing description it is seen that each guide member 55, with exception of its tapering ends, has a uniform cross-section comprising an eccentric portion, and that the direction of eccentricity of this latter portion varies along the member. This variation is responsible for the oscillating or turning movement of the cages.

Each guide member 55 is supported by flat holders 62 (Figs. 1 and 4) which are affixed to the strip 58, extend therefrom in the direction of the strip's eccentricity and are not thicker than the distance between the strip sides 59 or than the width of the slot 61. The holders are preferably affixed to strip portions that have horizontal sides 59. In this case, the holders of one guide member 55 extend from this member toward the other guide member or toward the inner side of the path of the cages. Each holder 62 is supported by the frame 1. For example, each holder may be affixed to a post 63 which, in turn, is affixed to one of the traverses 11 (Fig. 3). When a block 24 passes a holder 62, the holder end affixed to the strip passes through the slot 61 of the block.

The bottoms of the cages 25 are open and preferably slightly spaced from the track. The bottoms of the bottles 28 positioned in the cavities 27 reach through the open bottoms of the cages into sliding contact with the track. Where necessary or desired, the track may be bordered by walls. For example, a vertical wall 64 is affixed on top of the platform 13 and extends along the outer side of the track part 48, and another vertical wall 65 affixed on top of the platform 12 extends along the outside of the track part 51. The tracks and their walls contribute to the guidance of the bottles and, hence, of the cages.

The drums 19 rotate in the directions of the arrows 66. Hence the track part 49 is positioned in front of the wound track parts, seen in the direction of the movement of the cages, and the track part 51 follows the wound track parts in this moving direction.

A movable track or conveyor 67 extends horizontally from that side which is the lower side in Fig. 1 in a slot of the platform part 15. This slot reaches from a line 68 to a line 69, crosses the track part 49 and forms a gap in this track part. The conveyor 67 may be constituted by the upper surface of a flexible element or chain 71 of well known structure. This surface is positioned at the same level as the platforms and moves in the direction of the arrow 72 whereby bottles placed on the outer end of the conveyor are carried toward the gap and toward the path of the cages. The chain 71 may run over a wheel 73 positioned near the end 68 of the slot and over a similar wheel positioned near the end 69. The upper part of this chain forming the conveyor 67 moves away from the wheel 73, and the lower part of the chain returns to this wheel. The wheel 73 has a shaft 74 rotatable in bearings 75 affixed to the frame extension 16. The other wheel engaging the chain 71 has a shaft 76 rotatable in bearings 77 affixed to the frame 1.

A vertical wall 78 is affixed on top of the platform 15 and extends along a side of the conveyor 67 toward that line of the gap in the track part 49 which, in the direction of the movement of the cages, is the beginning of the gap. The wall 78 ends at a slight distance from the path of the cages 25 and has two finger-like projections 79 reaching into this path. The cages pass over the lower finger 79. The upper finger 79 is positioned at the level of the slot 29 (Fig. 10) whereby the cages can pass the latter finger too.

A shorter wall 81 of the same height as the wall 78 extends along the other longitudinal side of the conveyor 67, ends at a slight distance from the path of the cages and points toward that line of the gap in the track part 49 which, in the direction of the movement of the cages, is the end of this gap. The extreme end 82 of the wall 81 may be flexible. A preferably resilient wall 83 may be affixed to the wall 81 and extends along the outer side of the track part 49.

The wall 81 has a fixed or stationary position during the rinsing operation of the machine, but this position is adjustable. In addition, the wall 81 can slide laterally under excessive pressure. When this lateral dislocation of the wall occurs, it causes stoppage of the movement of the cages and of the rinsing operation. These functions of the wall 81 may be achieved by the following structure:

The platform 15 has a groove 84 in which a plate 85 is slidably guided in a direction perpendicular to the wall 81. This plate is urged into the shown position, for example, by the tension of two springs 86. Each spring 86 has one end affixed to a pin or post 87 affixed to the plate 85 and has another end affixed to a similar pin 88 affixed to the platform 15. A projection 89 is affixed on top of the plate 85. The wall 81 is adjustably affixed to the plate 85 as will be described later.

A switch 91 of well known structure serves to interrupt the bottle-transporting operation of the machine. For example, this switch interrupts the electric circuit 125 of a motor 124 (Fig. 12) of any known and suitable type from which this operation is derived. The switch 91 is operated by an arm 92 which has a free end carrying a rotatable roller 93. A spring 94 having ends affixed to the arm 92 and to the housing of the switch 91 urges the roller 93 into contact with the projection 89. When the plate 85 is pressed against the tension of the springs 86 to the left side in Fig. 6, the roller 93 drops from the projection 89 whereby the arm 92 turns and operates the switch 91.

A horizontal plate 95 forms an extension of the lower end of the wall 81 and has a rim 96 slidably contacting a ledge 97 which forms a projection of the plate 85. The rim 96 and the ledge 97 extend in a direction which divides the angle between the track 49 and the conveyor 67. In the shown embodiment, the direction of the conveyor 67 is perpendicular to the direction of the stationary track 49, and the ledge 97 includes an angle of forty-five degrees with either of these directions whereby the ledge 97 divides into halves the angle between these directions. The plate 95 has two slots 98 and 99 extending parallel to the ledge 97. Two headed bolts 111 and 112 pass through these slots and have threaded lower ends 113 (Fig. 6) engaging correspondingly threaded holes of the plate 85. The head of the bolt 111 may contact the plate 95 without pressure. The head of the bolt 112 forms an elongated stem and is provided with a handle 114. When the bolt 112 is tightened, it presses the plate 95 against the plate 85 whereby these plates are firmly connected and the position of the wall 81 is fixed. When the bolt 112 is loose, the position of the wall 81 can be adjusted by shifting the plate 95 on the plate 85 in the direction of the ledge 97. Such adjustment changes the distance of the wall 81 from the wall 78 in the same degree as the distance of the wall 81 from the path of the cages. Hence one adjustment is sufficient for adjusting both tracks 49 and 67 to bottles of a different diameter.

A bottle brining and capping machine of known type has a movable conveyor for the transport of bottles. The starting end 115 of this conveyor forms an element incorporated in the shown embodiment and a joint element of the rinsing and of the brining and capping machine. The latter conveyor may have the same structure as the track 67. The conveyor end 115 extends into a slot of the platform part 14 as far as line 116 (Fig. 1) and runs over a wheel 117 positioned near this line. The wheel 117 has a shaft 118 rotatable in bores of walls 119 affixed to the frame 1. These walls may extend from the line 116 beyond the broken off left end of Fig. 1 and may connect the shown embodiment of the rinsing machine with the brining and capping machine.

The conveyor 115 has its upper surface at the level of the platform 14. This conveyor part runs from the upper side of the wheel 117 through a gap in the platform 14 toward the capping machine and returns therefrom to the lower rim of this wheel. Two walls 121 and 122 are affixed on top of the projecting portions of the walls 119. The wall 121 extends along one side of the conveyor 115 and is so outwardly bent that this wall abuts the wall 65. The wall 122 extends along the other conveyor side, ends at a slight distance from the path of the cages and points toward that line of the gap in the platform 14 which, in the direction of the movement of the cages, is the end of the gap. Two fingers 123 extend from the wall 122 into the path of the cages at the same levels as the fingers 79 of the wall 78.

The movements of the cages and of the conveyors 67 and 115 are preferably co-ordinated by interconnected gears. For example, the drums 19 moving the cages, and the conveyor 67 may derive motion from the wheel 117 engaging the conveyor 115. This latter conveyor and the wheel 117 may be driven in well known manner by a motor 124 which is an element of the capping machine and is operated by an electric circuit 125 (Fig. 12) deriving current from tapping poles 126 of an electric network. In the shown embodiment, the co-ordination of these movements is achieved in the following manner:

The shaft 118 of the wheel 117 is affixed to another wheel 127. A chain 128 connects the latter wheel with a wheel 129 which is affixed to a shaft 131. The shaft 131 is rotatably supported by bearings affixed to the frame 1. For example, this shaft may pass through a bore of a transverse 132 of the frame-work. A conical wheel 133 is affixed to the inner end of the shaft 131 and engages the conical wheel 21. In this manner, the wheel 117 drives the wheel 21 and, hence, the shaft 17 and the drum 19 affixed to the latter shaft. This drum causes circular transport of the blocks 24, cages 25 and wires 23.

The wheel 21 further engages another conical wheel 134 affixed to a shaft 135 which is rotatable in bores of traverses 8. A wheel 136 is affixed to the same shaft. A chain 137 connects the wheel 136 with a wheel 138 affixed to the shaft 76, in a manner which reverses the direction of rotation. For example, the chain 137 may additionally run over an idle or guide wheel 139 having a shaft 141 rotatable in another bore of the traverse 8. In this manner, the wheel 117 drives the shaft 76 from which the movement of the conveyor 67 is derived as has been described before.

A water supply is arranged over the path of the cages 25 and may comprise a U-shaped tube 142 semicircularly extending over that part of the stationary track 48 which is at the right side in Fig. 1 and reaching in straight directions into the space over the tracks 49 and 51. This tube receives water through a tube 143 from a suitable source. The tube 142 has a number of outlets 144 distributed over the horizontal stretches of the stationary track. The outlets 144 are so high that the cages can pass under the outlets. Preferably, each of the horizontal stretches is positioned under several outlets 144.

The tube 142 may be supported by the frame 1 in any suitable manner. For example, the posts 63 are arranged in pairs and a bridge 145 connects the top ends of each pair of posts. These bridges carry the tube 142.

The described machine operates as follows:

A quantity of bottles of uniform size is treated in one continuous run of the machine. The wall 81 is adjusted to the diameter of these bottles in the manner described before. The cage grate 31 is adjusted to the height of these bottles as described before. Then, the motor is started and open bottles filled with fruits, for example, with olives and pimentos, are placed in erect position on the outer part of the conveyor 67. The further operation is completely automatic.

The conveyor 67 transports the bottles toward the path of the cages 25. Each bottle reaching this path enters the cavity of a cage which, at that time passes over the gap in the track 49. The speeds of the conveyor 67 and of the cages are so co-ordinated that, whenever a following bottle arrives in this gap, a following cage is in position for receiving this bottle. The cage transports the bottle along its path, the bottom of the bottle sliding over the stationary track.

During this transportation, the bottle is held in a uniform definite position relatively to the cage by co-operation of the cage and of the stationary track. The bottle is held in its axial direction without considerable clearance between the adjusted cage grate 31 and the stationary track. In the direction of transportation, the sliding bottom of the bottle is guided by and remains parallel to the stationary track while a side of the bottle extends in contact with the cage wall 26 parallel to the wall 26 and perpendicularly to the bottom of the bottle and to the stationary track. The right angle between the cage wall 26 and the stationary track determines the position of the bottle also when the bottle slides along the wound or inclined track part 43, the cage tilting with the bottle in accordance with the inclination of the track 43 because of the correspondingly wound projection 58 of the guide member 55. In this manner, the guide member 55 and the track 43 co-operate in guiding and tilting the bottle.

Another function and advantage of the stationary track is that this track makes possible the described simple and reliable arrangement for feeding the bottle into or out of the path of the cage. The position of the bottle during its transportation by the cage is sufficiently determined by the cage wall 26, the grate 31 and the stationary track. The bottom and one side of the cage may be open. This open cage structure (made possible by the stationary track) allows the feeding of the bottle into the cage on a conveyor reaching into a track gap under the cage, whereupon the bottle can be transported by the cage from the conveyor to the track.

While cage and bottle move over the horizontal track 49, water flows from outlets 144 into the bottle. The quantity of this water supply may be larger than the bottles can receive. In this case, some water will flow over the mouth of the bottle whereby the fruits are partially rinsed. A more thorough change of rinsing water occurs while the bottle is carried along the further track comprising the wound and inclined track parts. Whenever this track, the cage and the bottle tilt, water flows out of the bottle through the grate 31 which, at the same time, prevents the bottle from falling out of the cage and prevents fruits from escaping the bottle. While the bottle is tilted about more than ninety degrees, substantially all water leaves the bottle.

This water is replaced when bottle and cage pass over the next horizontal stretch of the stationary track. Also this second time, the water supply may be excessive. This process of supply and discharge of water is preferably repeated several times. For example, the shown embodiment comprises four wound track parts of the type illustrated by Fig. 3, each part causing discharge of water supplied to the bottles during their passage over a preceding horizontal track part.

When a bottle reaches the gap in the track 51, the bottle slides on the conveyor 115 and is intercepted by the fingers 123. The conveyor 115 moves the bottle toward the brining and capping machine where the bottle may be salted and capped in known manner.

When a bottle topples before being properly engaged, only a portion of the bottle will enter the cage while another portion remains between the walls 78 and 81. Such a toppled bottle obstructs the progress of the cage and would cause breakage either of the bottle or of a part of the transport mechanism if the latter would continue moving. This disadvantage is avoided in the following manner:

The pressure of the moving cage presses the toppled bottle against the wall 81. This wall, together with the plate 85, slides in the direction of this pressure, overcoming the tension of the springs 86. Thereby the switch 91 interrupts the circuit of the motor in the manner described before whereupon the transport of the cage stops. When the correct erect position of the bottle has been restored, the springs 86 move the wall 81 back into the previous position, the switch closes the circuit again, and the transport operation is resumed.

I desire it understood that my invention is not confined to the particular embodiment shown and described, the same being merely illustrative, and that my invention may be carried out in other ways without departing from the spirit of my invention as it is obvious that the particular embodiment shown and described is only one of the many that may be employed to attain the objects of my invention. For example, the brining or salting operation, instead of being carried out by the capping machine, may be taken over by those outlets 144 of the rinsing machine which are positioned over the track part 51 and, hence, follow the last wound track parts.

Having described the nature of my invention, what I claim and desire to protect by Letters Patent is:

1. A machine for rinsing bottled fruits, comprising a guide member extending in a substantially horizontal direction and having a guiding surface extending parallel to said direction along a portion of said member and being so wound along another portion of said member that the inclination of said surface alternately increases and diminishes in a range of more than ninety degrees; a cage slidably engaging said guide member and surface, an open bottle held in said cage in a definite direction relatively to said cage, said latter direction being vertically upright when said cage engages said first mentioned member portion, means moving said cage along said guide member whereby said cage and said bottle tilt oscillatingly when said cage slides along said other member portion, said cage having an opening positioned over said bottle in upright position of the latter, and an apertured element attached to said cage and positioned across said opening, each aperture of said element being narrower than said bottle whereby said bottle is prevented from falling out of said cage in tilted position.

2. A machine for rinsing bottled fruits, comprising a guide member extending in a substantially horizontal direction and having a guiding surface extending parallel to said direction along a portion of said member and being so wound along another portion of said member that the inclination of said surface alternately increases and diminishes in a range of more than ninety degrees; a stationary track extending along said guide member at a uniform distance therefrom, having a horizontal portion along said first mentioned portion of said member and being so wound along said other portion of said member that the inclination of said track varies in accordance with the inclination of said guiding surface, a cage slidably engaging said guide member and surface and having a bottom opening facing said track, an open bottle held in said cage in a definite direction relatively to said cage, reaching through said bottom opening and having a bottom slidably contacting said track, said latter direction being vertically upright when said cage engages said first mentioned member portion, means moving said cage along said guide member whereby said cage and said bottle tilt oscillatingly when said cage slides along said other member portion, said cage having an opening positioned over said bottle in upright position of the latter, and an apertured element attached to said cage and positioned across said opening, each aperture of said element being narrower than said bottle whereby said bottle is prevented from falling out of said cage in tilted position.

3. A machine for rinsing bottled fruits, comprising a guide member extending in a substantially horizontal direction and having a guiding surface extending parallel to said direction along a portion of said member and being so wound along another portion of said member that the inclination of said surface alternately increases and diminishes in a range of more than ninety degrees, a cage slidably engaging said guide member and surface, an open bottle held in said cage in a definite direction relatively to said cage, said latter direction being vertically upright when said cage engages said first mentioned member portion, means moving said cage along said guide member whereby said cage and said bottle tilt oscillatingly when said cage slides along said other member portion, said cage having an opening positioned over said bottle in upright position of the latter, and a grate positioned across said opening.

4. A machine for rinsing bottled fruits, comprising a stationary track having horizontal parts and inclined parts and having a gap in a horizontal part, a cage having a cavity for the reception of a bottle, means moving said cage in a path parallel to and along said stationary track and over said gap, said cage having an open bottom facing said stationary track whereby a bottle in said cavity can reach through said cage bottom into sliding contact with said stationary track, and a conveyor reaching into said gap in a direction crossing said path, said conveyor having a horizontal conveying surface flush with said horizontal track part, said cage having an open side facing, when said cage moves over said gap, that side from which said conveyor reaches into said gap.

5. A machine for rinsing bottled fruits, comprising a stationary track having horizontal parts and inclined parts and having a gap in a horizontal part, a cage having a cavity for the reception of a bottle, means moving said cage in a path parallel to and along said stationary track and over said gap, said cage having an open bottom facing said stationary track whereby a bottle in said cavity can reach through said cage bottom into sliding contact with said stationary track, a conveyor reaching into said gap in a direction crossing said path, said conveyor having a horizontal conveying surface flush with said horizontal track part, said cage having an open side facing, when said cage moves over said gap, that side from which said conveyor reaches into said gap, and two parallel vertical walls positioned along the longitudinal sides of said conveyor, being higher than said conveying surface and ending at a slight distance from said path, one of said walls being adjustable by shift parallel to itself in a direction dividing into halves the angle between the direction of said conveyor and the direction of said path crossed by said conveyor direction whereby adjustment of said latter wall simultaneously and equally changes the distance of the adjusted wall from said path and from the other wall.

6. A machine for rinsing bottled fruits, comprising a stationary track having horizontal parts and inclined parts and having a gap in a horizontal part, a cage having a cavity for the reception of a bottle, means moving said cage in a path parallel to and along said stationary track and over said gap, said cage having an open bottom facing said stationary track whereby a bottle in said cavity can reach through said cage bottom into sliding contact with said stationary track, a conveyor reaching into said gap in a direction crossing said path, said conveyor having a horizontal conveying surface flush with said horizontal track part, said cage having an open side facing, when said cage moves over said gap, that side from which said conveyor reaches into said gap, and a vertical wall positioned along a longitudinal side of said conveyor, being higher than said conveying surface, ending at a slight distance from said path and having a finger-like extension reaching into said path, said cage having a slot so positioned that said cage can pass said extension.

BERNARD C. EISENBERG.

REFERENCES CITED

The following references are of record in the file of this patent:

UNITED STATES PATENTS

| Number | Name | Date |
|---|---|---|
| 1,197,903 | Boyd | Sept. 12, 1916 |
| 1,585,392 | Lathrop | May 18, 1926 |
| 1,651,925 | Marsh | Dec. 6, 1927 |
| 1,688,501 | Larson | Oct. 23, 1928 |
| 1,781,425 | Anderson | Nov. 11, 1930 |
| 2,083,356 | Batdorf | June 8, 1937 |
| 2,102,094 | Romig | Dec. 14, 1937 |
| 2,202,640 | Thomas | May 28, 1940 |
| 2,409,341 | Borg | Oct. 15, 1946 |
| 2,439,075 | Christiansen | Apr. 6, 1948 |
| 2,461,277 | Hohl | Feb. 8, 1949 |
| 2,547,076 | Du Bois | Apr. 3, 1951 |

FOREIGN PATENTS

| Number | Country | Date |
|---|---|---|
| 515,363 | Germany | Jan. 5, 1931 |